Patented July 21, 1936

2,048,283

UNITED STATES PATENT OFFICE

2,048,283

CONDENSATION PRODUCTS OF NAPHTHALENE SULPHONIC ACIDS WITH AMINO SALICYLIC ACIDS AND PROCESS OF PREPARING THEM

Franz Neitzel, Basel, Switzerland, assignor to the firm Durand & Huguenin S. A., Basel, Switzerland No Drawing. Application April 25, 1935, Serial No. 18,254. In Germany May 5, 1934

9 Claims. (Cl. 260—109)

It is known that naphthols and naphthylamines can be condensed with aromatic amines in the presence of alkali bisulphite to form aryl-substituted naphthylamines (see, for example, the article of H. Bucherer and A. Stohmann, in Zeitschrift für Farben und Textilchemie, vol. III, 1904, pages 57 and 77 et seq.).

The condensation may be represented as follows:

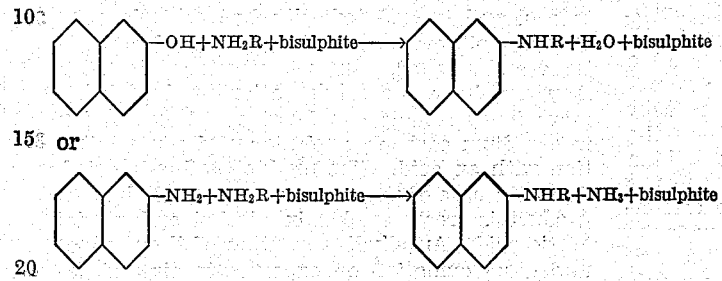

wherein R represents an aryl radical.

With regard to the condensation of naphtholsulphonic acids or naphthylaminesulphonic acids with aminosalicylic acid there are only few indications in the literature, see Bucherer and Rauch, Jour. f. pr. Ch., 132, pages 232 and 253-254. But the characteristic feature of the present invention has not heretofore been disclosed.

It has now been found that the condensation of aminosalicylic acid with naptholsulphonic acids or naphthylaminesulphonic acids does indeed proceed only poorly or even not at all if the two components are brought to reaction only in equimolecular proportions. However, the condensation proceeds considerably better if for each molecular proportion of the naphthalene component there is used more than 1 molecular proportion, preferably at least 2 molecular proportions of aminosalicylic acid.

In this way new bodies are obtained the composition of which does not correspond to an a priori supposed formula (for example):

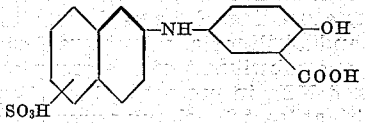

The constitution of these new bodies is more complicated. It appears that 1 molecule of aminosalicylic acid is utilized in the normal condensation, that is to say for the replacement of the OH- or NH2-group by the group NHR (wherein R represents a salicylic acid radical) and that the excess of the aminosalicylic acid also enters into combination, although nothing definite can be stated regarding the nature of this combination. It may be stated generally that an OH- or NH2-group in β-position will react more easily than such a group in the α-position. There are, however, instances in which the condensation of α-naphthols or α-naphthylaminesulphonic acids gives good yields; consequently the invention is not limited to the use of β-derivatives. The invention is furthermore applicable to aminonaphtholsulphonic acids.

The aminosalicylic acid used in this process may be para-aminosalicylic acid, the homologues or analogues thereof, such as para-amino-ortho-cresotinic acid, para-amino-meta-cresotinic acid, ortho-aminosalicylic acid or ortho-amino-para-cresotinic acid.

The new bodies constitute feebly colored, generally yellowish powders which dissolve in a solution of sodium carbonate and are reprecipitated by acidification of the solution; they are also freely soluble in organic solvents, such as alcohol, glacial acetic acid and the like.

The new condensation products are intended for use as intermediate products in the manufacture of dyestuffs.

The following examples illustrate the invention, the parts being by weight:

EXAMPLE 1

*Condensation of 2-naphthol-7-sulphonic acid with para-aminosalicylic acid*

246 parts of sodium 2-naphthol-7-sulphonate of 100 per cent. strength (=1 mol.) and 306 parts of aminosalicylic acid of 100 per cent. strength (=2 mols) are dissolved in 1000 parts of water containing 80 parts of sodium hydroxide of 100 per cent. strength (=2 mols). 2000 parts of a bisulphite solution of 44 per cent. strength are added and the whole is boiled for 3-4 hours. The end of the reaction is indicated when free naphthol sulphonic acid can no longer be detected by reaction with diazobenzene. The reaction mixture is then acidified, the sulphurous acid is expelled and the whole is allowed to cool. The new condensation product which precipitates is filtered, washed with water and dried. It is a yellowish body which dissolves readily in a solution of sodium carbonate and is reprecipitated by acidification of the solution. In contrast to the parent material it no longer couples with diazobenzene in alkaline solution and is freely soluble in organic solvents, such as alcohol, glacial acetic acid and the like. The results of analyses lead to the conclusion that the new compound contains 2 molecules of para-aminosalicylic acid bound to 1 molecule of 2-naphthol-7-sulphonic acid.

In a similar manner 2-naphthol-6-sulphonic acid, 2-naphthol-8-sulphonic acid or 2-naphthylamine-6-sulphonic acid can be condensed with para-aminosalicylic acid.

EXAMPLE 2

*Condensation of 2-naphthol-6,8-disulphonic acid with para-aminosalicylic acid*

348 parts of sodium 2-naphthol-6,8-disulphonate of 100 per cent. strength (=1 mol.) and 459 parts of para-aminosalicylic acid of 100 per cent. strength (=3 mols) are dissolved in 1500 parts of water containing 120 parts of sodium hydroxide of 100 per cent. strength (=3 mols). 2500 parts of a bisulphite solution of 44 per cent. strength are added and the whole is boiled, the volume being allowed to diminish owing to evaporation. The end of the condensation can easily be recognized by the fact that a sample of the reaction mass, when made alkaline with sodium carbonate, no longer shows the blue fluorescence of the parent material. Boiling is then discontinued, the mixture is diluted with water to its original volume, and when cold, is acidified with hydrochloric acid. There is precipitated a yellowish body, which is filtered, washed with water and dried. It is freely soluble in alkali solutions and is reprecipitated by acidification of the solution. In contrast to the parent material, the product is freely soluble in organic solvents, such as alcohol, glacial acetic acid and the like. The results of analyses indicate that in the new compound 1 molecule of 2-naphthol-6,8-disulphonic acid is combined with 3 molecules of para-aminosalicylic acid.

EXAMPLE 3

*Condensation of 2-amino-8-naphthol-6-sulphonic acid and para-aminosalicylic acid*

239 parts of 2-amino-8-naphthol-6-sulphonic acid of 100 per cent. strength (=1 mol.) and 306 parts of para-aminosalicylic acid of 100 per cent. strength (=2 mols) are dissolved in 800 parts of water containing 120 parts of sodium hydroxide of 100 per cent. strength. 2000 parts of a bisulphite solution of 44 per cent. strength are added and the whole is boiled, while the volume is allowed to diminish owing to evaporation. After about 2½ hours the condensation is finished; free aminonaphtholsulphonic acid can no longer be recognized by the diazobenzene reaction and a yellowish body begins to precipitate. The mass is diluted to its original volume and hydrochloric acid is added until the reaction is strongly acid towards Congo. The new condensation product thus precipitated is filtered, washed with water and dried. Condensation proceeds with the elimination of ammonia, whose presence can be recognized in the reaction mass. The new compound, unlike the parent material, no longer couples with diazobenzene in a solution alkaline with sodium carbonate. It is freely soluble in alkali solutions and is reprecipitated by acidification of the solution. It is freely soluble in organic solvents, such as alcohol and glacial acetic acid. According to the results of analyses it is to be concluded that 1 molecule of 2-amino-8-naphthol-6-sulphonic acid has reacted with 2 molecules of aminosalicylic acid.

EXAMPLE 4

*Condensation of 1-naphthylamino-6-sulphonic acid with para-aminosalicylic acid*

223 parts of 1-naphthylamino-6-sulphonic acid of 100 per cent. strength (=1 mol.) and 306 parts of para-aminosalicylic acid (=2 mols) are dissolved in 1000 parts of water containing 120 parts of sodium hydroxide of 100 per cent. strength (=3 mols) and the solution is heated to boiling with 2000 parts of a bisulphite solution of 44 per cent. strength for about 20 hours in a reflux apparatus. A sample of the reaction mixture, when mixed with alkali and hypochlorite gives a red color at the beginning of the condensation, but should give a blue color when the condensation is finished. At this stage, boiling is discontinued and the mixture is allowed to cool and is acidified with hydrochloric acid. The precipitated new condensation product is filtered and washed. Any parent material, which may remain in the condensation product, being more freely soluble, can be removed by solution in a sodium carbonate solution and reprecipitation with an acid. The product is finally dried. As in the case of the foregoing examples the new product is freely soluble in alcohol and glacial acetic acid. An alkaline solution of the product undergoes oxidation on exposure to air and assumes a blue color. According to the results of analyses the new product is formed by reaction between two molecules of aminosalicylic acid and 1 molecule of 1-naphthylamine-6-sulphonic acid.

In a similar manner 1-naphthylamine-4-sulphonic acid or 1-naphthylamine-3,8-disulphonic acid can be condensed with para-aminosalicylic acid.

In each of the foregoing examples there may be used instead of para-aminosalicylic acid a homologue or analogue thereof, such as para-amino-ortho-cresotinic acid, para-amino-meta-cresotinic acid, ortho-aminosalicylic acid or ortho-amino-para-cresotinic acid.

The condensation products obtainable in accordance with the present invention are intended for use as intermediate products in the manufacture of dyestuffs.

What I claim is:—

1. A process for producing condensation products of the naphthalene series comprising condensing 1 molecular proportion of a member of the group consisting of the naphthalenesulphonic acids and alkali metal salts thereof containing at least one substituent of the group consisting of OH and NH2, in presence of an alkali bisulphite, with at least 2 molecular proportions of an aminosalicylic acid.

2. A process for producing condensation products of the naphthalene series comprising condensing 1 molecular proportion of a member of the group consisting of the hydroxynaphthalenesulphonic acids and alkali metal salts therof, in presence of an alkali bisulphite, with at least two molecular proportions of an aminosalicylic acid.

3. A process for producing condensation products of the naphthalene series comprising condensing 1 molecular proportion of a member of the group consisting of the aminonaphthalenesulphonic acids and alkali metal salts thereof, in presence of an alkali bisulphite, with at least two molecular proportions of an aminosalicylic acid.

4. A process for producing condensation products of the naphthalene series comprising condensing 1 molecular proportion of 2-hydroxynaphthalene-6,8-disulphonic acid, in presence of an alkali bisulphite, with 3 molecular proportions of an aminosalicylic acid.

5. A process for producing condensation products of the naphthalene series comprising condensing 1 molecular proportion of 1-aminonaphthalene-6-sulphonic acid, in presence of an alkali bisulphite, with 2 molecular proportions of an aminosalicylic acid.

6. A process for producing condensation products of the naphthalene series comprising condensing 1 molecular proportion of 2-hydroxynaphthalene-6,8-disulphonic acid, in presence of sodium bisulphite, with 3 molecular proportions of para-aminosalicylic acid.

7. Intermediate products of the naphthalene series from 1 molecular proportion of a naphthalenesulphonic acid containing at least one substituent of the group consisting of OH and $NH_2$, and at least two molecular proportions of an aminosalicylic acid, said reactants being condensed in presence of an alkali bisulphite, said products constituting feebly colored, generally yellowish powders soluble in a solution of sodium carbonate and capable of being reprecipitated by acidification of the solution, and being also freely soluble in both alcohol and glacial acetic acid.

8. Intermediate products of the naphthalene series from one molecular proportion of a hydroxynaphthalene sulphonic acid and at least two molecular proportions of an aminosalicylic acid, said reactants being condensed in the presence of an alkali bisulphite, said products constituting feebly colored, generally yellowish powders soluble in a solution of sodium carbonate and capable of being re-precipitated by acidification of the solution, and being also freely soluble in both alcohol and glacial acetic acid.

9. Intermediate products of the naphthalene series from one molecular proportion of an aminonaphthalene sulphonic acid and at least two molecular proportions of an aminosalicylic acid, said reactants being condensed in the presence of an alkali bisulphite, said products constituting feebly colored, generally yellowish powders soluble in a solution of sodium carbonate and capable of being re-precipitated by acidification of the solution, and being also freely soluble in both alcohol and glacial acetic acid.

FRANZ NEITZEL.